July 1, 1958 A. H. STAHLHUTH 2,841,348
EXHAUST PIPE RESILIENT SUPPORT MOUNT
Filed Nov. 2, 1953 2 Sheets-Sheet 1

INVENTOR
Arthur H. Stahlhuth
BY
L. D. Burch
ATTORNEY

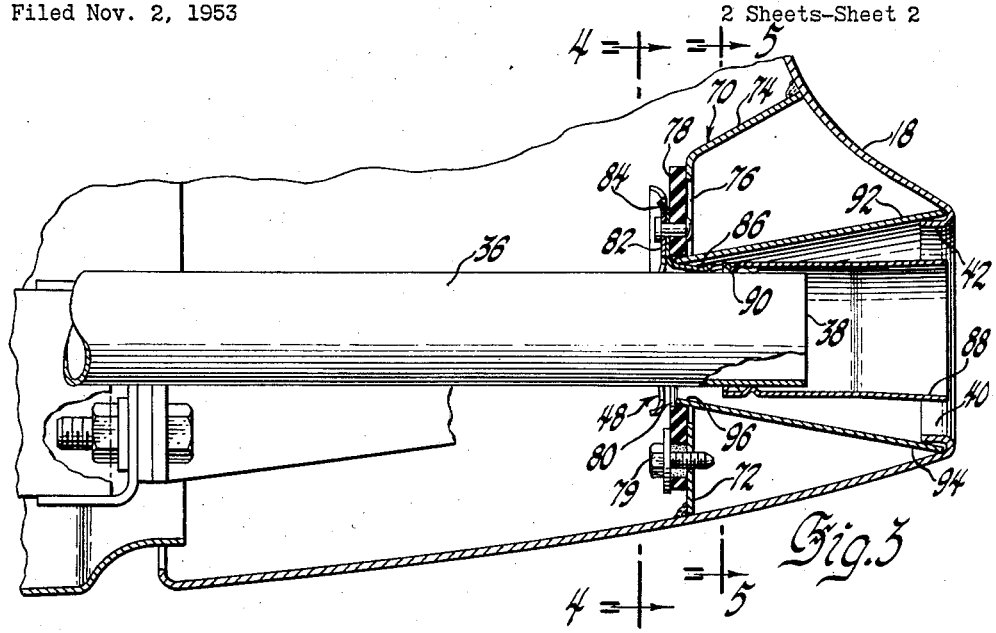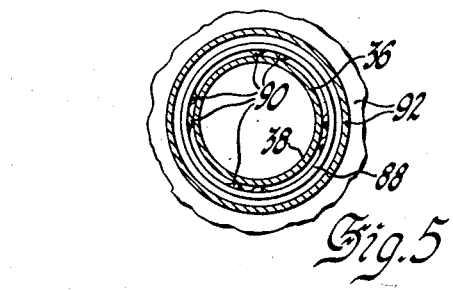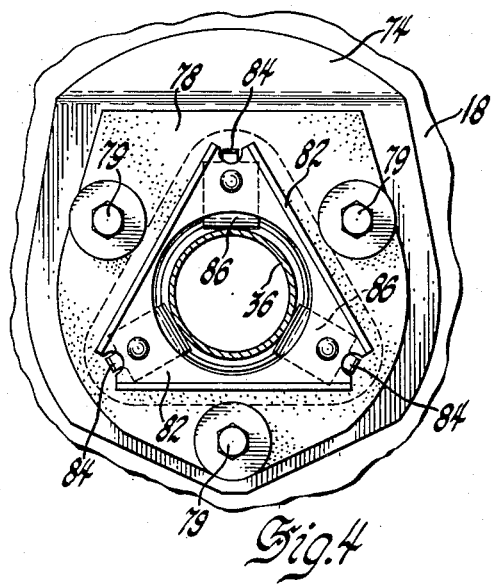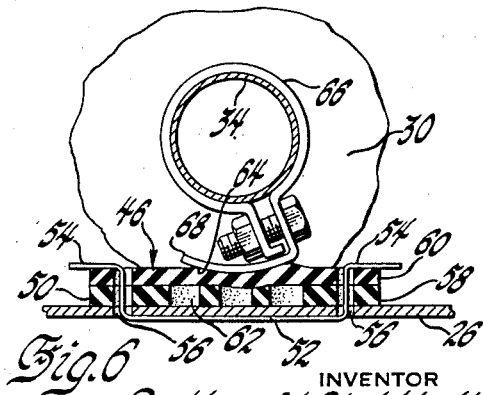

United States Patent Office 2,841,348
Patented July 1, 1958

2,841,348

EXHAUST PIPE RESILIENT SUPPORT MOUNT

Arthur H. Stahlhuth, Detroit, Mich., assignor to General Motors Corporation, Detroit, Mich., a corporation of Delaware Application November 2, 1953, Serial No. 389,744

3 Claims. (Cl. 248—65)

The present invention relates to exhaust systems and more particularly to suspension means for resiliently mounting an exhaust system on a vehicle.

In mounting an engine exhaust system on a vehicle it is highly desirable that the exhaust system be acoustically isolated from the vehicle body so as to minimize the transmission of engine noises and vibrations to the passenger compartment. In the past it has been the practice to support the exhaust system on the vehicle frame by one or more mountings having an acoustical insulator. These insulators are usually a member of sound absorbent material which has the opposite ends thereof firmly attached to a rigid member on the vehicle frame and a rigid member on the exhaust pipe. Frequently during use the exhaust system becomes bent or otherwise deformed. This imposes an abnormal strain on the insulators and prevents the normal operation of the sound deadening material.

Accordingly, it is proposed to provide a novel suspension system for resiliently supporting an exhaust conduit on a vehicle. The suspension system will permit the exhaust system to move with respect to the vehicle frame without interfering with the operation of the sound deadening insulators. The suspension system includes one or more center supports and an end support. The center support may include a resilient pad secured to the frame for carrying the center portion of the exhaust system. The end support may include an insulating member secured to the vehicle and having a plurality of spring clips slidably engaging the exhaust pipe. The end support permits the end portion of the exhaust pipe to slide longitudinally so as to accommodate lateral deflections of the center portion.

Referring to the drawings:

Fig. 3 is a cross section taken substantially along the plane of line 3—3 of Fig. 1.

Fig. 4 is a cross section taken substantially along the plane of line 4—4 of Fig. 3.

Fig. 5 is a cross section taken substantially along the plane of line 5—5 of Fig. 3.

Fig. 6 is a cross section taken substantially along the plane of line 6—6 of Fig. 2.

Figure 1:
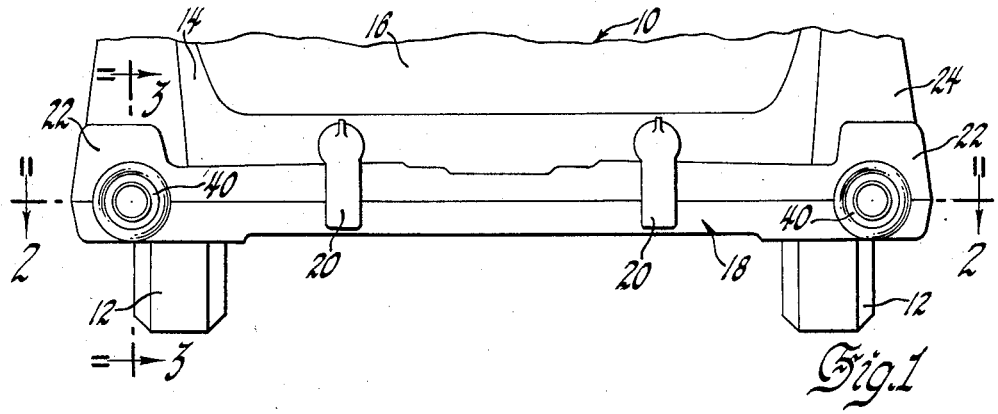
Fig. 1 is a fragmentary end view of an automobile employing the present invention.
Figure 2:
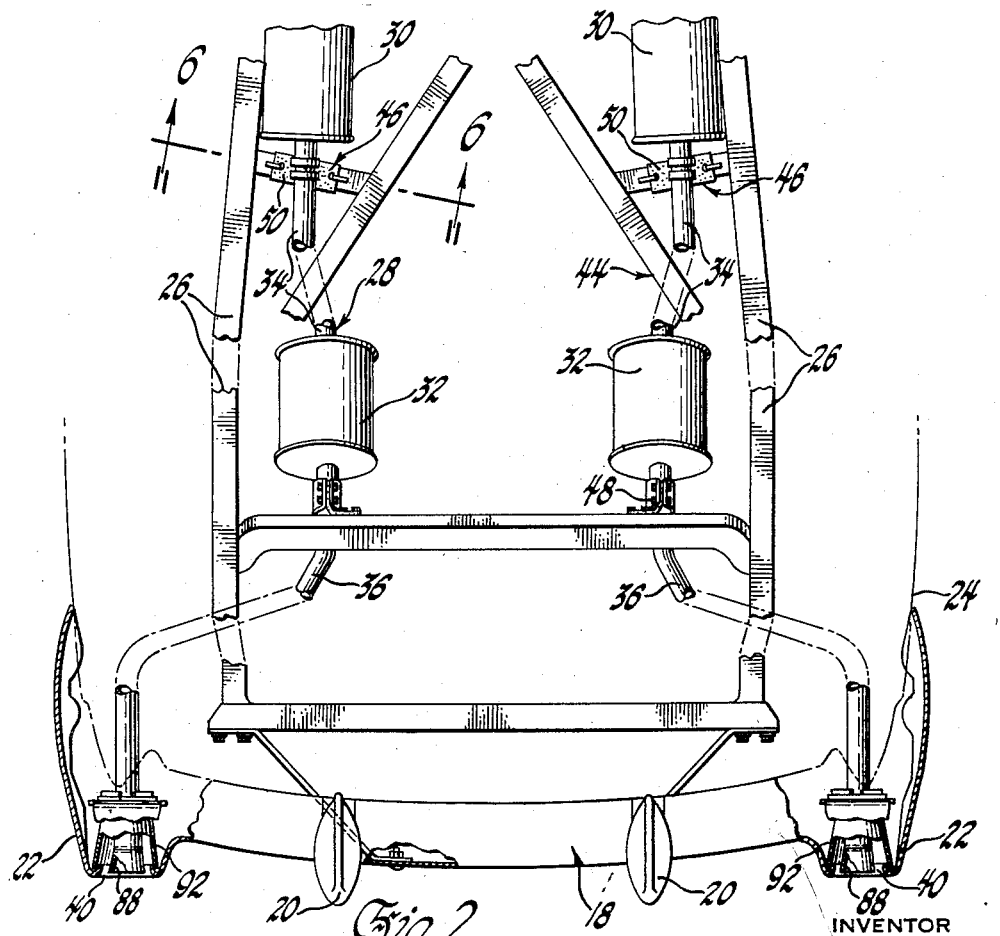
Fig. 2 is a plan view of the frame and exhaust system of the vehicle shown in Fig. 1.

Referring to the drawings in more detail, a vehicle 10 is partially supported on a pair of rear wheels 12 and has a body portion 14 with a hinged rear deck lid 16. A bumper structure 18 may be mounted on the rear end of the vehicle 10 so as to extend transversely below the deck lid 16. The bumper 18 employs a pair of vertical bumper guards 20 in the center thereof and a pair of enlarged end portions 22 that extend around the sides of the rear fenders 24. The body 14 and rear bumper 18 are carried on a frame 26. The engine exhaust gases are carried by an exhaust system 28 to the rear of the vehicle 10.

Although a double exhaust system 28 is employed, it should be understood that the invention is equally applicable to a single exhaust system. Each of the exhaust systems include a muffler 30 and a silencer 32 which are interconnected by an exhaust pipe 34. A tailpipe 36 may be provided in each system. One end of each tailpipe 36 is connected to the silencer 32 and the other end 38 thereof is positioned to discharge through an aperture 40 in the bumper 18. The apertures 40 are formed in the end portions 22 of the bumper 18 and have an inwardly turned flange 42. In order to dampen engine noises and prevent the transmission thereof to the vehicle body, each of the exhaust systems may be resiliently supported on the vehicle frame by a sound deadening suspension system 44. In the present instance this suspension system 44 includes one or more center supports 46 and an end support 48.

Each of the center supports 46 may include a resilient pad 50 containing a sound deadening material. The pad 50 may be secured to the vehicle frame 26 by any suitable means such as the wire fastener 52. This wire fastener 52 may embrace a portion of the frame and have the opposite ends 54 extend through openings 56 in the ends of the pad 50. The ends 54 of the fastener are bent over to secure the pad 50 in place. In the present instance the pad 50 is secured to the frame 26 in a substantially horizontal position so as to fully support the weight of the exhaust system.

Each pad 50 is preferably fabricated from a sound absorbent material and has a resilient base 58 and an outer cover 60. The base portion 50 may comprise any suitable resilient material such as a soft rubber. A plurality of holes may be provided to form small air pockets 62. The cover 60 may also be made of rubber, however, the cover should contain a material suitable for forming a wear receiving surface 64 that can withstand a large amount of sliding engagement. It is thus apparent that a durable resilient pad has been provided.

To assist in supporting the exhaust system on the pad 50, a collar 66 may be provided on the exhaust pipe 34 adjacent the pad 50. A rocker arm 68 may be formed integral with the collar 66 so as to project outwardly therefrom. The rocker arm 68 preferably has a convex surface which is positioned to ride on the wear receiving surface 64 on the cover of the pad 50. In case of a severe shock it is possible for the rocker arm 68 to be lifted clear of the pad 50, however, the weight of the exhaust system will normally retain the rocker arm in engagement with the pad. It should be noted that the exhaust system is resiliently supported on the pad 50 but it is possible for the exhaust system to move with respect to the frame 26 as a result of the rocker arm 68 either sliding or rolling on the pad. By employing a mounting of this nature it is possible for the center portion of the exhaust system to be deflected laterally and torsionally. If for any reason such a deflection is permanent the sound absorbent qualities of the resilient pad 50 will not be impaired.

Each end support 48 is adapted to resiliently maintain the end 38 of one of the tailpipes 36 properly positioned for discharging the exhaust gases through the aperture 40 in the bumper 18. The rear supports 48 may include a bracket 70 which is secured to the inside of the bumper 18 by any suitable means such as welding. In the present instance this bracket 70 comprises a plate having a vertical portion 72 and an inclined portion 74. An enlarged opening 76 may be provided in the vertical portion 72 so as to register with the aperture 40 in the bumper 18. An acoustical insulator 78 comprising a resilient sound absorbent material may be secured to the bracket 70 by means of screws 79 so that an opening 80 therethrough will register with the opening 76 in the bracket 70. If it is desired to increase the rigidity of the insulator 78, an annular stiffener ring 82 may be secured to the insulator 78. The discharge end 38 of the tailpipe 36 may extend through both of the openings 76 and 80 so as to register with the aperture 40 in the bumper 18. In order to resiliently retain the tailpipe 36 in such position, a plurality of spring clips 84 may be employed. These clips 84 are secured to the insulator 78 at circumferentially spaced points so as to radially project into the openings 76 and 80. Each clip 84 may have a tail 86 which slidably engages the exterior of the tailpipe 36 to resiliently support the tailpipe. If the lateral deflections of the center portion of the exhaust system are large enough to cause reciprocating movement of the end 38 of the tailpipe, the clips 84 will slide on the tailpipe 36 without interfering with the action of the center mounting 46. Thus the combined action of the resilient spring clips 84 and the acoustical insulator 78 will prevent vibrations being transmitted to the vehicle body 14.

Due to manufacturing difficulties there may be considerable variation in the length of the exhaust system 28. Since these variations prevent the proper positioning of the end 38 of the tailpipe 36 with respect to the plane of the aperture 40, a tubular extension 88 may be adjustably secured to the end of the tailpipe 36. It will thus be possible to properly position the end of the tubular extension 88 in the aperture 40 regardless of the length of the exhaust system 28. This extension may be secured to the pipe 36 by any suitable means such as two annular sets of dimples 90 which project inwardly from the extension to slidably engage the tailpipe 36.

It may be desirable to conceal the bracket 70 and other mounting structure so that it is not visible through the aperture 40. In the present instance a shield 92 is provided for this purpose. The shield 92 comprises a conical member of resilient material which has the enlarged end 94 seated on the flange 42 around the aperture 40 while the reduced end 96 is seated in the openings 76 and 80.

It will thus be apparent that the center support 46 and the end support 48 provide a suspension system 44 for resiliently supporting an exhaust system 28. This system 44 will provide the minimum amount of noise transfer from the exhaust system 28 to the body 14 and will at the same time provide a reliable suspension for the exhaust system. The center mountings 46 in the system 44 primarily allows lateral deflections of the center portion of the exhaust system but at the same time allows twisting of the exhaust pipe 34. Since movements of this nature will affect the positioning of the entire exhaust system, the rear mounting 48 cooperates with the center mounting 46 by allowing the tailpipe 36 to move in response to the position of the center portion of the exhaust system 28.

While the foregoing description and figures have been confined to one embodiment, it will be apparent to those skilled in the art that numerous modifications may be made without departing from the spirit thereof. Accordingly, it is to be understood that the foregoing is to be considered as illustrative only and in no way restrictive, reference being had to the appended claims to determine the scope of the invention.

What is claimed is:

1. A mounting for resiliently supporting an exhaust pipe on a vehicle, said mounting including a resilient pad of sound absorbent material secured to said vehicle, said pad having a wear receiving surface thereon, a collar secured to said exhaust pipe, and an arcuate member projecting from said collar to form a cantilever beam in intimate contact with said wear receiving surface for rolling and sliding thereon.

2. A mounting for resiliently supporting a vehicle exhaust system on a vehicle, said mounting comprising a sound absorbent pad secured to said vehicle, said pad having a base portion of resilient sound absorbent material and an outer portion of wear receiving material, a collar secured to said exhaust pipe, and an arcuate member projecting from said collar to form a cantilever beam having an arcuate surface in intimate contact with said wear receiving surface for rolling and sliding thereon.

3. In a vehicle having an exhaust system, a mounting for resiliently supporting the exhaust pipe of said exhaust system on said vehicle, said mounting comprising a sound absorbent pad having a resilient base of sound absorbent material and a wear receiving outer surface, a fastener on said pad for securing said pad in a substantially horizontal position on said vehicle to expose said wear receiving surface, a collar clamped to said pipe, and a member on said collar projecting outwardly therefrom and having an arcuate cantilever portion formed in spaced relation to said exhaust pipe to frictionally engage said wear receiving surface for rolling and sliding movement thereon to support said exhaust pipe for movement with respect to said vehicle.

References Cited in the file of this patent

UNITED STATES PATENTS

| | | |
|---|---|---|
| 993,510 | Cowles | May 30, 1911 |
| 1,240,521 | Wendland | Sept. 18, 1917 |
| 1,911,485 | Axlund | May 30, 1933 |
| 2,160,808 | Bradley | June 6, 1939 |
| 2,226,505 | Saurer | Dec. 24, 1940 |
| 2,288,172 | Ulrich | June 30, 1942 |
| 2,308,969 | Riesing | Jan. 19, 1943 |
| 2,515,391 | Arbib | July 18, 1950 |
| 2,568,409 | Phillips | Sept. 18, 1951 |
| 2,738,151 | Herzog | Mar. 13, 1956 |

FOREIGN PATENTS

| | | |
|---|---|---|
| 419,944 | Italy | Apr. 14, 1947 |
| 678,688 | Great Britain | Sept. 3, 1952 |